April 1, 1969 MASAICHI SHINODA 3,436,280

METHOD OF PRODUCING A VARIABLE CAPACITANCE DIODE

Filed June 27, 1966 Sheet 1 of 3

United States Patent Office 3,436,280 Patented Apr. 1, 1969

3,436,280

METHOD OF PRODUCING A VARIABLE CAPACITANCE DIODE

Masaichi Shinoda, Sagamihara-shi, Japan, assignor to Fujitsu Limited, Kawasaki, Japan, a corporation of Japan Filed June 27, 1966, Ser. No. 560,599
Claims priority, application Japan, June 30, 1965, 40/39,496
Int. Cl. H01l 7/46
U.S. Cl. 148—178 2 Claims

ABSTRACT OF THE DISCLOSURE

Described is a method of producing a germanium variable capacitance diode, which comprises alloying a pellet consisting of a carrier selected from the group consisting of lead, indium and mixtures thereof, antimony, gallium and tin to an n-type germanium wafer, whereby the antimony distribution function is changed by the quantity of tin. The alloy pellet consists, in atom percent, of about 5 to 50% tin, 0.1 to 4% gallium, 0.05 to 3% antimony and the remainder selected from lead, indium and mixtures thereof. The alloy temperature of 550 to 750° C. is maintained from 5 to 100 minutes.

The present invention relates to germanium variable capacitance diodes. It is an object of the present invention to devise a method which affords producing germanium variable capacitance diodes of improved uniformity of operational characteristics which particularly lends itself to quantity production and the diodes prepared by said method.

The invention will be described in greater detail with reference to the accompanying drawings in which.

Figures 1, 2, 3, 6, 7:
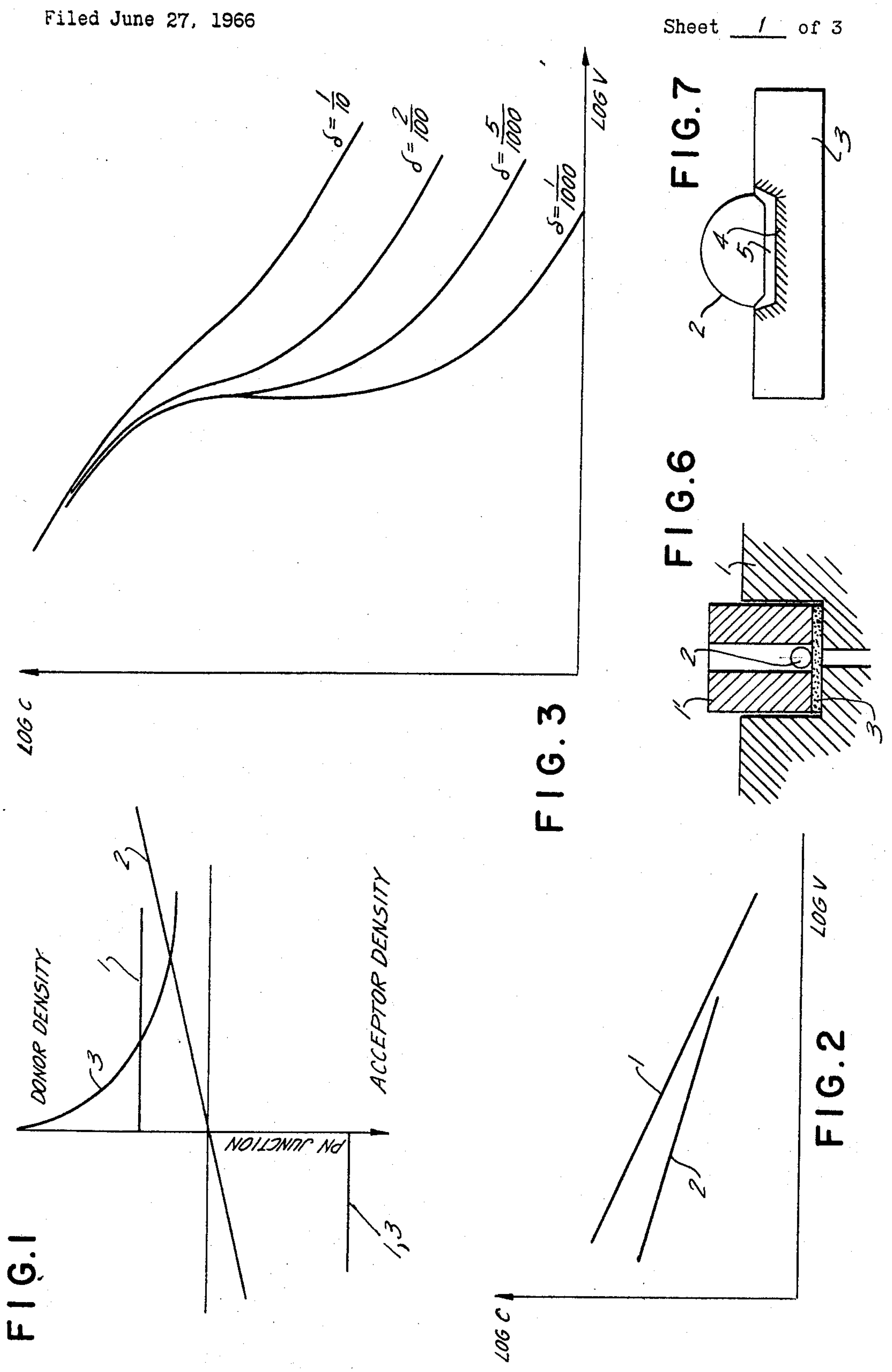
FIG. 1 is an explanatory graph of the impurity distributions.
FIGS. 2 and 3 are explanatory graphs of conventional variable capacity diodes.
FIGS. 6 and 7 illustrate an embodiment of the present invention.

Variable capacitance diodes are predicated upon the fact that the thickness of the depletion layer in a p-n junction of a semiconductor is controlled by the voltage applied to the junction, and therefore, the junction capacity generated therein is controlled by the voltage. The operation is such that when the voltage is applied to the junction, the charge carriers in the junction area move in the direction of the electric field and produce there the space-charge distribution. At the locality where the potential of the space-charge is balanced by the applied voltage, the movement of the carrier is terminated. This determines the thickness of the depletion layer. For a given impurity distribution in the junction area and the neighboring area, the relationship between the applied voltage and thickness of the depletion layer is set. The junction capacity $C_j$ is related to the thickness of the depletion layer as follows:

$$C_j=\frac{AK}{W} \quad (1)$$

wherein

A=junction area
K=dielectric constant of the semiconductor
W=thickness of the depletion layer Thus, the relationship between capacity and voltage is exclusively determined by the impurity distribution. This means that a variable capacity diode of any desired capacity-voltage characteristic can be obtained by using the appropriate impurity distribution.

Conventional techniques of making p-n junctions and impurity distributions are as follows:

(i) alloy method
(ii) diffusion method

There are other methods such as the epitaxial technique, a growth technique and a growth diffusion technique. The impurity distributions from these techniques, however, coincide with the distribution from one of the two methods (i) and (ii). In manufacturing a p-n junction by the alloy technique, a dopant or an alloy thereof, is placed upon a semiconductor pellet. Thereafter, the temperature is raised to a value wherein the alloy material and the semiconductor body both melt. The alloy material melts into the semiconductor body. When a saturation stage is reached, the melting in is discontinued. Thereafter, upon cooling of the heated body, a semiconductor eutetic containing dopant impurities in a recrystallized layer as a solid solution results according to the segregation coefficient of the materials. This recrystallized layer therefore, has a conductance type determined by the dopants in the solid solution. The impurity distribution in the recrystallized layer is practically constant. In a junction of this type, the inner face between the liquid phase and the solid phase, when the saturation point was reached, becomes the junction. A uniform density distribution is available on both sides of the junction. This is known as an abrupt junction, and is shown at 1 in FIG. 1.

In the diffusion technique, a base body is placed into an atmosphere of the doping atom or a compound thereof. This is then heated up to a constant temperature. The impurities indiffuse into the semiconductor body on the surface thereof at a rate proportional to the slope of the impurity density. This distribution in time, as is known, is according to:

$$N_s erfc\frac{x}{\sqrt{Dt}} \quad (2)$$

or $$N_s exp-\left(\frac{x}{\sqrt{Dt}}\right)^2$$

wherein $N_s$ is the diffusion surface density, D is the diffusion coefficient and $t$ is the diffusion time.

If the impurity dopant density in the atmosphere and accordingly the dopant density of the diffusion surface layer temperatures or times are changed, $N_s$, D and $t$ change. The distribution function, however, remained constant. When using conventional techniques of adding impurities, one can achieve only either the uniform density distribution as (i) or the density distribution according to (ii). When using (ii) with a base of opposite conductance type to that of the dopant impurity to be indiffused, one obtains a sloping type junction shown by 2 in FIG. 1. If, however, the diffusion is into a base body of the same conductance type and subsequently dopant of opposite conductance type is diffused or alloyed in, one achieves a curve such as 3 of FIG. 1. This latter curve is known as the hyper-abrupt type.

When using one of the other manufacturing techniques such as those mentioned above, e.g. the epitaxial technique, one produces a device of the above types. Their C-V characteristics are shown in FIGS. 2 and 3. In FIG. 2, straight line 1 shows a device of the abrupt type and straight line 2 shows a device of the sloping type. Using distributions of this kind the only modifications available are those above.

FIG. 3 shows a hyper-abrupt junction wherein the distribution follows $$erfc\frac{x}{\sqrt{Dt}}$$

Using a conventional diffusion method, the distribution is limited to this type or the type $$exp-\left(\frac{x}{\sqrt{Dt}}\right)^2$$

In both cases, the distribution type is determined by the ratio $\delta$ of the diffusion surface density and the density of the semiconductor body. In FIG. 3, $\delta$ is a parameter which, as is seen from the graph, is a function of an extremely high degree (infinite in the algebraic expression), and the C-V characteristic becomes complicated. In accordance with the conventional method of manufacturing, described above, it is impossible to produce impurity distributions other than those specified with only the resulting specific C-V characteristics described above.

On the other hand, variable capacity diodes together with transistors are utilized in an extremely wide field. It is the trend to manufacture communication equipment and electronic equipment using solid-state devices instead of electron tubes to make the equipment more reliable, more efficient and more miniaturized. Diodes of the types indicated above may also be utilized in some equipment but in the practical use of diodes, specific capacity-voltage characteristics are required for the specific purpose of their use. For example, broad-band frequency modulators are required to increase the communication capacity. This is made possible by the transistorized oscillator, using a variable capacity diode in the L-C resonance circuit or other devices. However, in order to satisfy the broad-band characteristic, the following C-V characteristic is required. Junction capacity C and voltage V are, in the small signal operation, related with each other as $$\frac{1}{\sqrt{C}}\alpha(V+\text{const}) \quad (3)$$

in the large amplitude operation, they are related experimentally as $$\sqrt{C}\alpha(\text{const}-V) \quad (4)$$

and further, in the C-R oscillation type, they are related as $$\frac{1}{C}\alpha(V+\text{const}) \quad (5)$$

Furthermore, a frequency multiplier requires a characteristic which cannot be realized by the conventional method in order to obtain the maximum efficiency. In most cases, the C-V characteristics required for diodes cannot be realized by the conventional method of manufacturing.

As described above, the C-V characteristics, required for most systems, need greater capacity change than the abrupt type in the area of high junction voltage, and fall within the hyper-abrupt type junction (a junction having a density distribution in which the density decreases with distance from the junction). Therefore, among the C-V characteristics obtained by the conventional methods, the characteristics shown in FIG. 3 are closest to the practically required characteristics.

A supplementary explanation is given here so that the difference between the characteristics, obtained by the conventional methods, and those actually required may be better understood. First of all, as seen from expressions (3), (4) and (5), most of the practically required C-V characteristics have simple forms that can be expressed by an algebraic function of lower degree or at most, several degrees. In the case of the characteristic as shown in FIG. 3, however, the impurity distribution is expressed by $$erfc\frac{x}{\sqrt{Dt}} \text{ or } exp-\left(\frac{x}{\sqrt{Dt}}\right)^2$$

so that the C-V characteristic is a transcendental function of extremely high degrees (infinite) including functions of the above kind. Therefore, modifications are complicated and extremely great changes are made in certain areas, so that although it is partially possible to approximate the required characteristics, it is impossible to satisfy the requirement over a practically required broad range. From the above description, the importance of devising means and steps whereby the impurity distribution functions can be produced as the function types of lower degrees, is readily apparent.

It is the object of this invention to provide means which can produce the impurity distributions that satisfy the practical requirement as described above and which can bring the conventional distributions of the diffusion type near to the required distributions. Another object is to devise a method of adding impurities to produce useful variable capacity diodes, and the variable capacity diodes manufactured thereby.

It may be possible to produce particular impurity distributions with conventional diffusion methods by mechanically accumulating the impurity distribution in several stages. Using this method makes it necessary to precisely control each of said several diffusion stages so that each may have a thickness of several by 10 to 100 microns. Since such a diffusion technique is nearly impossible, this method is not effective.

Another method is to change the diffusion mechanism in some manner. The present invention is based on this latter idea.

The alloy diffusion method is the best method of producing a distribution, as shown in FIG. 3, closest to the useful characteristic, when germanium is used. This method will be explained briefly. Impurities of material with a large diffusion coefficient, such as antimony, and an alloy material including a material of a small diffusion coefficient and of a large solid phase solubility, which makes it possible to realize such density ratio that the density in the solid phase becomes large, such as for example, indium, are placed on the base body germanium (n-type in this case) which is then heated. Then, as in the alloy method described above, at a certain temperature, an equilibrium is reached after a certain time has elapsed, and the face of the liquid phase stops entering into the solid phase. Antimony, which has a large diffusion coefficient, diffuses into the solid body in accordance with the density in the liquid phase. The distribution available by this diffusion is of the type of $$erfc\frac{x}{\sqrt{Dt}}$$

(The Journal of the Institute of Eelectrical Communication Engineers of Japan, 47, P339, "Capacity characteristic of hyper-abrupt junction by alloy diffusion method"). When the materials are cool, a recrystallized layer with indium and antimony included therein as a solid solution forms. If the density of the indium is made larger, this layer becomes P-type with a hyper-abrupt type p-n junction. Detailed investigation shows that the C-V characteristics thus obtained follow FIG. 3.

The present invention utilizes this method and obtains various C-V characteristics which have hitherto been unavailable and presents other C-V characteristics of various function types. By this invention one can produce a variable capacity diode having a C-V characteristic which is not of the type of $$erfc\frac{x}{\sqrt{Dt}}$$

or $$exp-\left(\frac{x}{\sqrt{Di}}\right)^2$$

but can be expressed as an algebraic function of a low degree and has an extremely wide range and which has hitherto been unavailable. The invention employs an alloy-diffusion, into an n-type germanium, of an alloy material including lead, indium or a mixture thereof as the carrier, antimony as the n-type impurity, i.e. the diffusion agent, gallium as the P-type impurity, and tin.

Figure 5:
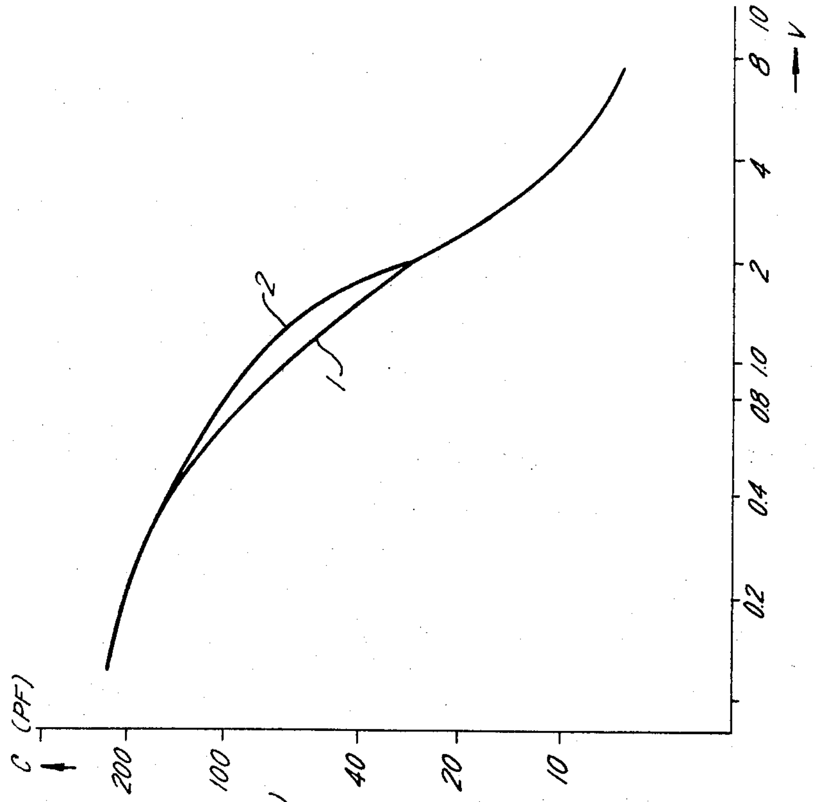
FIGS. 4 and 5 are explanatory graphs based upon the present invention.
Figure 4:
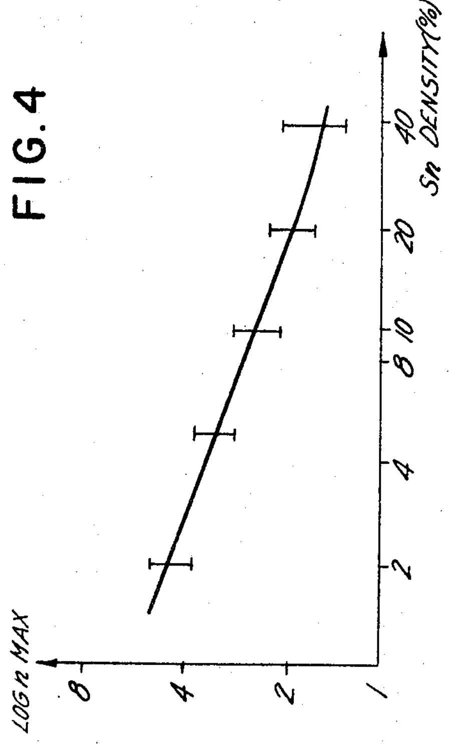

The invention will be described in further detail. When an alloy material having the combination of components of this invention is diffused on germanium, the antimony diffuses with a mechanism which is different from the law of diffusion hitherto known. The detail of the mechanism is not clear but can be assumed from various characteristics presented hereinbelow. As a known example of the situation wherein the diffusion distribution does not follow expression (2) is when phosphorus is diffused on silicon with a surface density above $10^{20}$ atoms/cm.$^3$. The distribution near the diffusion surface is a little different from the type of expression (2). The phenomenon of this invention is completely different from this effect as follows. Namely, in this invention, the distribution function type of the antimony is changed because of the admixture of tin, which is of the same periodic group as germanium, does not constitute a dopant therein. Moreover, the diffusion surface density of antimony is extremely low, e.g. below $10^{18}$ atoms per cm.$^3$. If silicon were used instead of germanium in the above example, the change is observed only at a position quite near the diffusion surface, whereas in accordance with this invention, the change extends to a considerable depth. Furthermore, the extent of departure from the distribution of complementary error function *erfc* is controlled over a board range by the density of the tin. And as a whole, the distribution available approaches one which can be expressed by an algebraic expression of low degree. As described above, if the impurity distribution is given, the C-V charatceristic is completely fixed or determined. Precise actual measurement of an impurity distribution is very difficult, so the C-V characteristic is used as the index of the impurity distribution. When the conventional alloy diffusion method or diffusion method is used, the impurity distribution becomes one of the *erfc* type with a C-V characteristic of FIG. 3. The impurity distribution is determined by $\delta$ only, and a value $$n_{\mathrm{MAX.}}=\frac{d \log C}{d \log V}$$

which is the maximum slope available when log $C$—log $V$ is plotted as determined exclusively by $\delta$. If the impurity distribution differs from *erfc*, the value of $n_{\mathrm{MAX}}$ should differ from the value of FIG. 3 if $\delta$ remains the same. If it is possible to make $\delta$ constant, it will be possible to utilize $n_{\mathrm{MAX}}$ to indicate the extent of said difference. According to the instant invention, since the diffusion surface density is barely influenced by the density of tin, so if the impurity density of the semiconductor base body can be made constant, it is possible to keep $\delta$ constant. FIG. 4 shows the relation between the density of tin and $n_{\mathrm{MAX}}$ experimentally obtained when $\delta$ is kept constant in the above-mentioned manner and the conditions of temperature and time are also kept constant. The germanium substrate wafer or body used in the example of FIG. 4 has a specific resistance of 7Ω cm. and is n-type and an antimony density of 0.5 atom percent. It is seen from FIG. 4 that as the density of tin increases $n_{\mathrm{MAX}}$ lowers and the algebraic function type changes into that of a lower degree. FIG. 5 shows an example of the C-V characteristics and corresponds to a product including tin of 40%. Curve 1 is the C-V characteristic of a diode in which tin is admixed while curve 2 is the C-V characteristic of a diode including no tin and coincides with FIG. 3. Since the areas of the two devices are made equal to each other, the fact that the capacitances at the lower voltage are equal to each other shows that the diffusion surface density is not changed by the tin, and the fact that the capacitances at the higher voltage are nearly equal to each other shows that the $\delta$'s are equal to each other. The amount of the capacitance change is determined by $\delta$ and the sensitivity of the capacitance change can be controlled by changing the temperature and the diffusion time. As described above, the function of the C-V characterstic can be determined by choosing the density of tin at a suitable value. However, the theoretical design is presently impossible, since it is difficult to actually measure the distribution of antimony. Furthermore, the mechanism is unclear. Thus, everything must be experimentally determined, although this is sufficient for practical purposes.

A specific embodiment of this invention will now be described.

The alloy material contains lead as the main component and the other components in quantities of tin may be 40% in atom percent, gallium, 1% and antimony, 0.5%. The alloy is placed in a quartz crucible or the like and is heated about 400° C. in an inactive gas, such as argon or nitrogen and is melted. The melt is well agitated and is flowed out into a quartz vessel or the like and is cooled. The ingot produced is rolled and stamped into a pellet of a size to produce the desired weight. If necessary, this pellet is made spherical by heating it at about 500° C. in a hydrogen gas. A platelet of n-type germanium of a specific resistance of 7Ω cm. and of a size of 0.05 x 2 x 2 (mm.)$^2$ is treated in a mixture of liquid fluoric acid and nitric acid and is placed into a jig of graphite or stainless steel. The alloy pellet is then placed on the germanium. Thereafter, the jig and contents are placed into a hydrogen atmosphere furnace and is heated.

In FIG. 6, 1 designates the jig, 2 designates the pellet of alloy material and 3 designates the germanium platelet. The alloy dot melts at a temperature of about 350° C. and if the temperature is further raised, germanium 3 dissolves into the molten alloy material and the face 4 of liquid phase enters into the germanium of platelet 3 as shown in FIG. 7. If the temperature is kept constant at a certain value, the germanium is saturated in the molten alloy and the face 4 of liquid phase stops entering. Antimony, which has a large diffusion coefficient, diffuses into the interior from this surface, but as described above, the antimony does not diffuse simply with a flow proportionate to its density sloping but diffuses by the interaction with the tin, and therefore, its distribution type becomes a peculiar distribution which does not follow $$erfc\,\frac{x}{Dt}$$

In this embodiment, diffusion is performed for 30 minutes at a temperature of 650° C. The materials are then cooled. Germanium is precipitated from the liquid phase and forms a recrystallized layer which is designated by 5 in FIG. 7. The impurities are included in the recrystallized layer as a solid solution according to the density in the liquid phase and the value of the segregation coefficients. Here, gallium is dominant and the recrystallized layer becomes p-type. When the temperature is lowered below 350° C., the entire material solidifies and the alloy diffusion is completed. A small amount of tin is included also in 4 and 5 in FIG. 7 but since it is neutral, it does not contribute to n-type nor to p-type.

Figure 8:
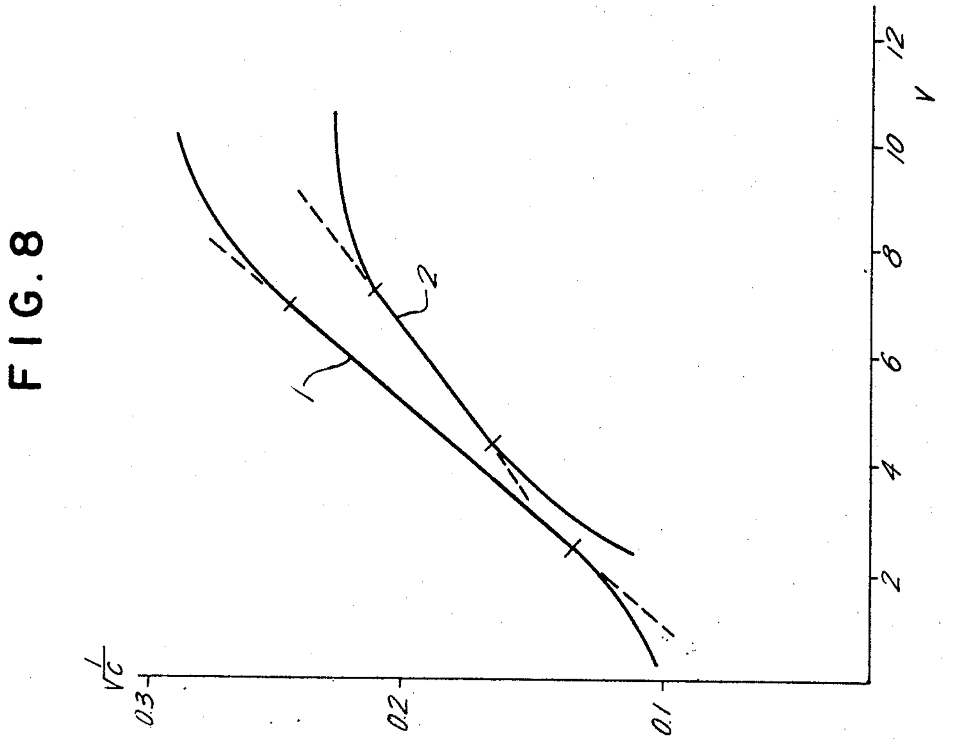

A wire is attached to the completed device, after eching and surface treatments are performed by the conventional methods. The characteristic of this device is shown in FIG. 8 by curve 1. In this embodiment, the characteristic shown by expression (3) can be obtained over a very wide range. Curve 2 shows, for comparison, the characteristic of a diode manufactured by the conventional diffusion method without tin. In this diode, all the conditions are chosen so as to be most suited for making its characteristic approximate expression (3). The specific band in the latter device is less than half that of the device in accordance with this invention.

Figure 9:
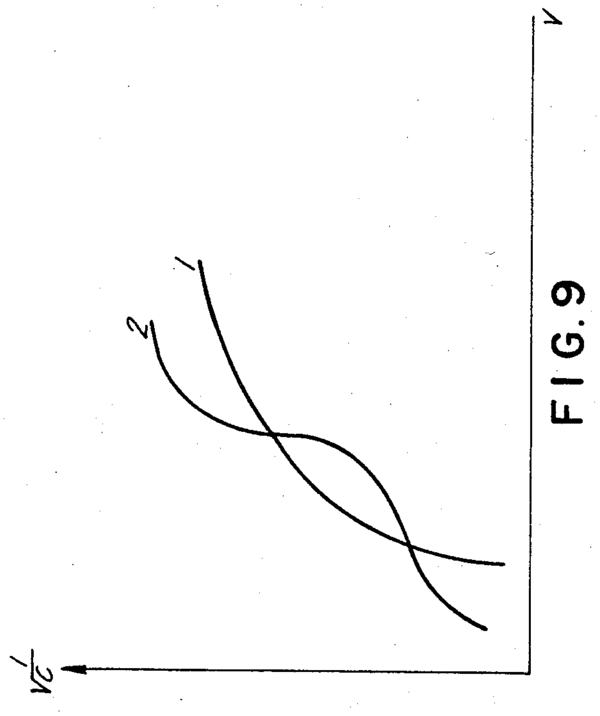
FIGS. 8, 9 and 10 are graphs showing the characteristics of variable capacitance germanium diodes of the present invention.

FIG. 9 is also for comparison. Curve 1 shows an example of the abrupt type junction and curve 2 shows an example of the conventional ordinary hyper-abrupt type junction. Thus can be seen the effectiveness of this invention. In obtaining the characteristic of this kind, an optimum condition can be obtained by choosing the density of tin at between 20 and 50% as the occasion demands.

Figure 10:
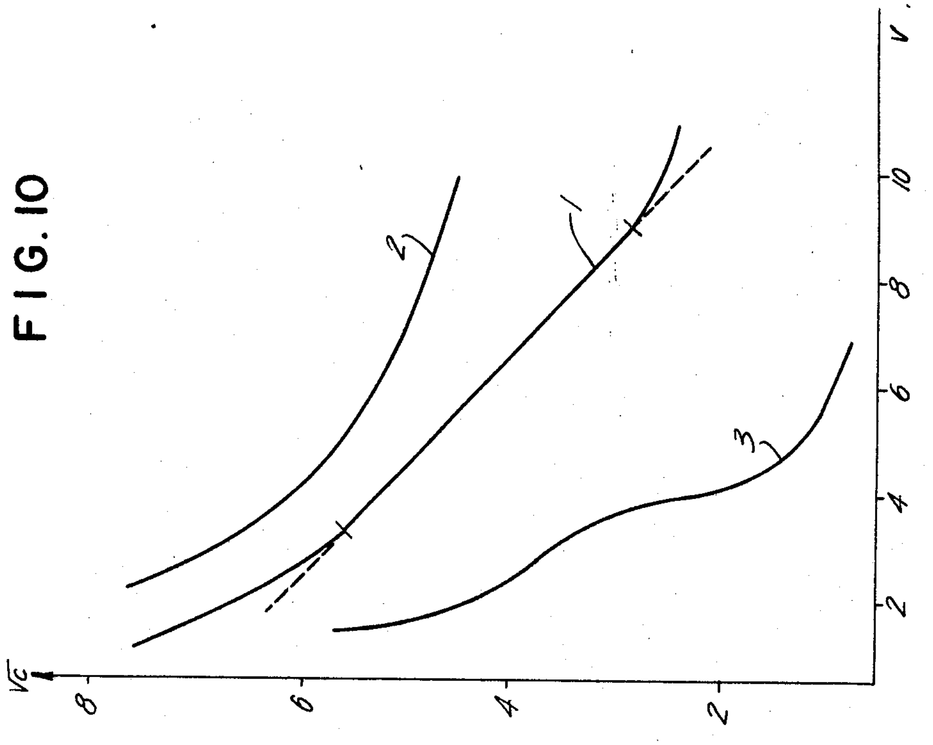

FIG. 10 shows another embodiment of this invention which was manufactured by alloy-diffusing of the alloy material including 10% tin into the n-type germanium of a specific resistance of 5Ω cm. for 70 minutes at 680° C. Curve 1 shows this embodiment which corresponds to expression (4). For comparison, curves 2 and 3 respectively, show the abrupt type and the conventional hyper-abrupt type. It is readily apparent that the type of this invention is superior to these conventional types. In this case, the optimum value of tin is 5 to 20%.

Furthermore, in a similar manner, it is possible to prepare diodes having other various effective relations, such as a diode in which the range wherein $n_{MAX}$ is constant is very wide, and a diode having the distribution corresponding to expression (5), by properly choosing the combination of the percentages of tin and antimony, the specific resistance of germanium, the temperature and the time.

In the above embodiments, lead was used as the carrier, but indium or an alloy of indium and lead can also be used as the carrier. Indium is a p-type dopant and when it is used as the carrier, it should be able to cause the recrystallized crystal to have about the same p-type density as gallium which is mixed by about 1%. However, if gallium is not used and indium only is used, the product is inferior in reproducibility. Even when indium is used as the carrier, it is therefore preferable to add gallium. Aluminum and boron are also p-type dopant impurities, but it is difficult to make a boron alloy and so it cannot be used practically. On the other hand, if aluminum is used in the pellet, antimony scarcely diffuses so that the alloy diffusion does not take place. Thus, only gallium can be used as the p-type impurity.

Bismuth, arsenic and phosphorus are also n-type impurities besides antimony. Phosphorus cannot be used for the same reason as the p-type boron. Arsenic, when it co-exists with gallium or indium, does not diffuse at all under 750° C. which is the effective temperature of a variable capacity diode. Bismuth has an extremely small segregation coefficient and is a metal difficult to handle. Thus, only antimony can be used as the n-type impurity.

When antimony is used to obtain the effective C-V characteristic of the variable capacity diode, the quantity of antimony has the lowest upper limit and it must be lower than 10 atom percent. Furthermore, the temperature must be under 750° C. It is also possible in principle to use tin as the carrier but the characteristic of the diode is unfavorable. Experiments show that lead, indium or an alloy of lead and indium is best suited as the carrier. In a conventional alloy diffusion method, a small amount of tin may be included in the alloy material with the purpose to raise the mechanical strength of the alloy material. In this invention, however, the purpose of including the tin is to thereby change the impurity density distribution.

Preferred ranges of materials for the alloy pellet, in atom percent, are from about 5 to 50% tin, 0.1 to 4% gallium, 0.05 to 3% antimony, and the remainder lead, indium or mixtures thereof. The alloy temperature used is preferably from 550° to 750° C. over a period of from 5 to 100 minutes whereby the antimony distribution function is changed by the quantity of tin.

I claim:

1. The method of producing a variable capacitance diode by the alloy diffusion method, which comprises alloying into an n-type germanium wafer a pellet consisting, in atom percent, of about 5 to 50% tin, 0.1 to 4% gallium, 0.05 to 3% antimony and the remainder selected from the group consisting of lead, indium and mixtures thereof, maintaining the alloy temperature of 550° to 750° C. from 5 to 100 minutes whereby the antimony distribution function is changed by the quantity of tin.

2. The method of claim 1 wherein the alloy pellet consists in atom percent of about 40% tin, 1% gallium, 0.5% antimony and the remainder lead, and the alloy temperature of about 650° C. is maintained for about 30 minutes.

References Cited

UNITED STATES PATENTS

| | | | |
|---|---|---|---|
| 3,152,373 | 10/1964 | Einthoven et al. ------ | 148—185 |
| 3,243,325 | 3/1966 | Shinoda ------------ | 148—178 |

RICHARD O. DEAN, *Primary Examiner.*

U.S. Cl. X.R.

148—185